Dec. 19, 1961  H. T. DRAUDT  3,014,125
SWITCHING MECHANISM FOR FLASHLIGHTS AND THE LIKE
Filed Jan. 7, 1959  2 Sheets-Sheet 1

INVENTOR.
HERBERT T. DRAUDT
BY Bosworth, Sessions,
Herrstrom & Knowles
ATTORNEYS.

Dec. 19, 1961 H. T. DRAUDT 3,014,125
SWITCHING MECHANISM FOR FLASHLIGHTS AND THE LIKE
Filed Jan. 7, 1959 2 Sheets-Sheet 2
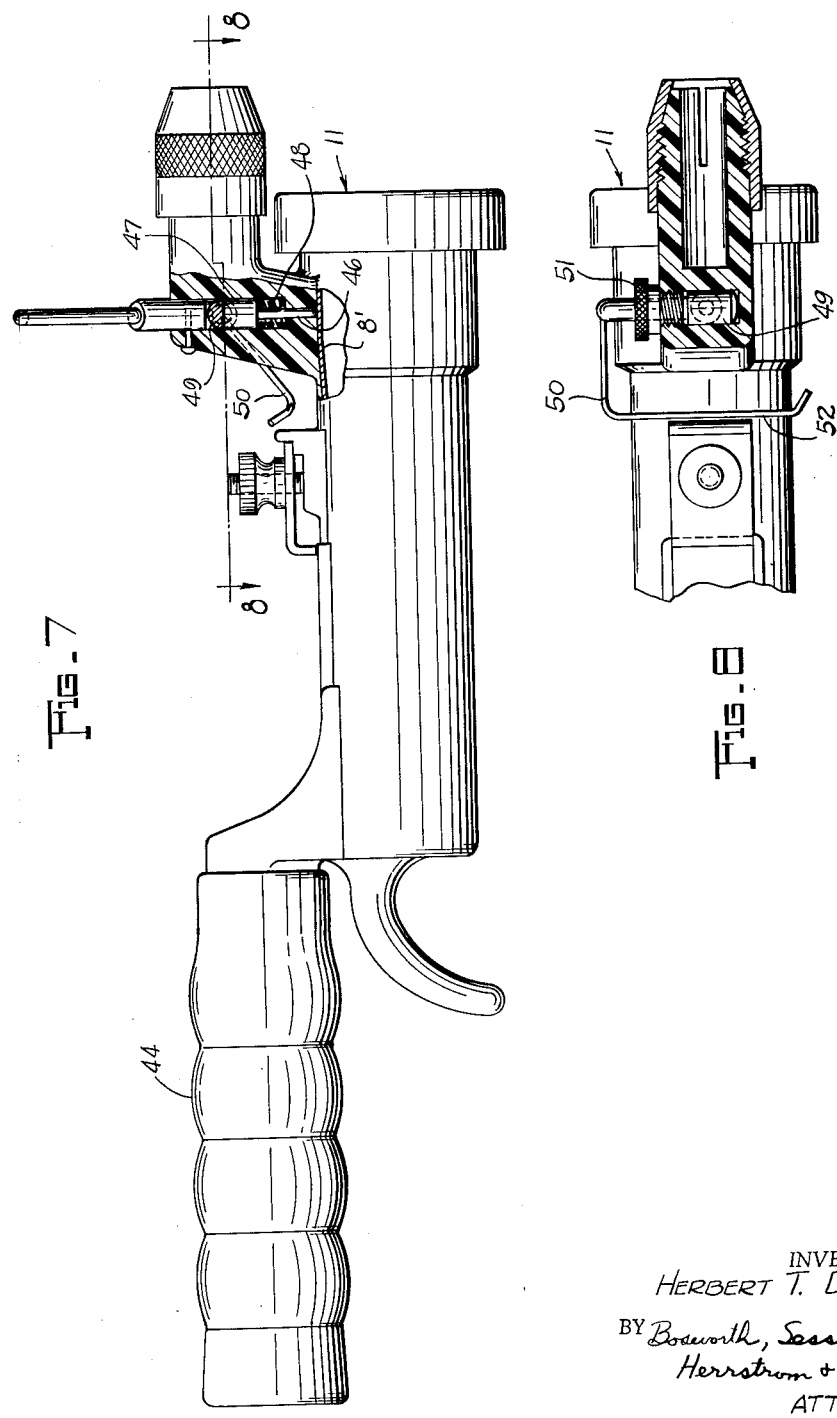
INVENTOR.
HERBERT T. DRAUDT
BY Bosworth, Sessions,
Herrstrom & Knowles
ATTORNEYS.

United States Patent Office 3,014,125
Patented Dec. 19, 1961

3,014,125
SWITCHING MECHANISM FOR FLASHLIGHTS AND THE LIKE
Herbert T. Draudt, 3612 Clague Road, North Olmsted, Ohio, assignor of one-half to Donald A. Draudt, North Olmsted, Ohio
Filed Jan. 7, 1959, Ser. No. 785,520
10 Claims. (Cl. 240—10.68)

The general object of this invention is to provide a new, improved, more efficient, useful and economic switch for flashlights and the like.

Another object of this invention is to provide an improved switch for flashlights and the like which is adjustable and can be selectively positioned to be permanently on, selectively on in response to a predetermined pressure of desired magnitude or permanently off.

Other objects of this invention include the provision of a switch for flashlights and the like which is adjusted by rotating the cap of the flashlight; which is economically manufactured; which is simple in structure and easily used; which is readily adapted for use with flashlights having molded plastic bodies; which need have no movable or exposed parts mounted exteriorly of the case, and which is actuatable by an adjustable predetermined pressure to turn the flashlight on.

A still further object of this invention is to provide a switch for flashlights and the like having one or more of the above objects and advantages.

These and other objects and advantages of this invention will become apparent from the following description of preferred and modified forms thereof, reference being made to the drawings in which:

FIGURE 7 is a view partly in elevation and partly in longitudinal section of a fishing pole handle including a flashlight having a modified form of switch embodying this invention; and, FIGURE 8 is a horizontal section taken along the line 8—8 of FIGURE 7.

Figure 1:
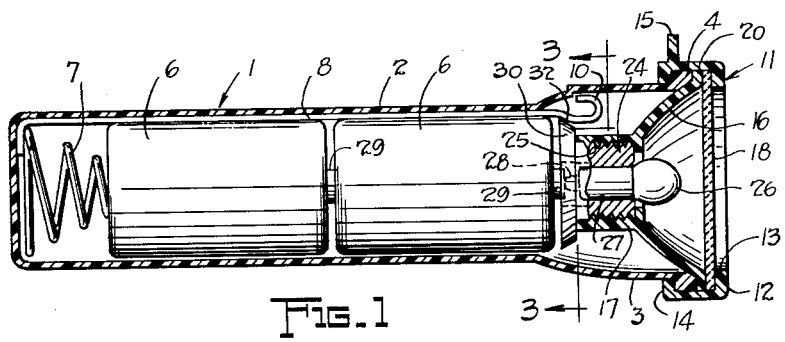
FIGURE 1 is a longitudinal section of a flashlight having a switch embodying a preferred form of this invention.
Figure 2:
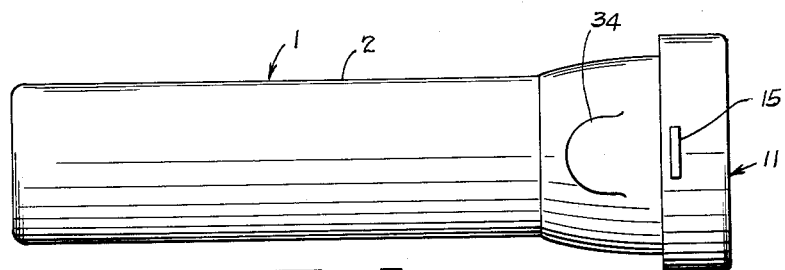
FIGURE 2 is an elevation of the flashlight shown in FIGURE 1, rotated 90°.
Figure 6:
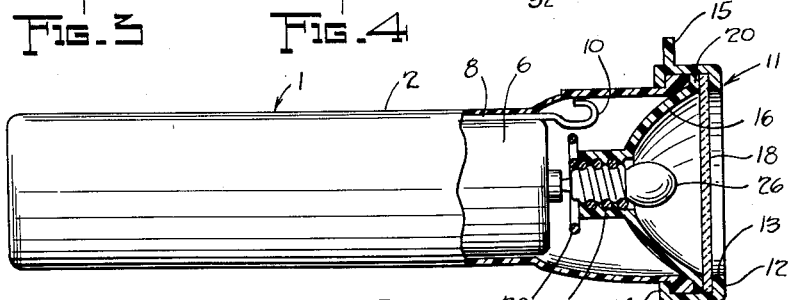
FIGURE 6 is a view partly in elevation and partly in longitudinal section of the flashlight shown in FIGURE 1 with still another form of socket for a switch embodying this invention.

A switch embodying this invention is adapted for use in flashlights and other apparatus and may be used with equal facility in many different types and kinds of general and special purpose flashlights such as those shown by way of illustration in FIGURES 1 and 6, as well as in other apparatus wherein a switch having the characteristics herein described is useful.

Broadly a switch embodying this invention comprises cam means carried by a lamp socket and rotatable from without the flashlight or apparatus to position a predetermined portion of the cam means opposite an electrical contact and means for selectively displacing the electrical contact toward the cam means. The cam means is preferably adapted to have a first position which is in permanent engagement with the contact means, a second position which is spaced from the contact means sufficiently so that the contact means cannot be displaced into engagement with the cam means, and to be selectively positioned intermediate said first and second positions so that an infinitely variable predeterminable pressure is necessary to displace the contact means into engagement with the cam means.

A switch embodying this invention is shown in FIGURE 1 together with a flashlight, indicated generally at 1, of which it is a part. It is to be understood, however, that switches embodying this invention may be adapted for use in other types of flashlights and apparatus and that other flashlights and apparatus may be adapted for use with switches embodying this invention.

The flashlight 1 comprises a case 2 which is formed with an opened and shaped end 3, having an outwardly extending flange 4 and which functions to retain the cap and bulb assembly in place. Case 2 is of sufficient internal size to receive one or more batteries 6 arranged in series in the conventional manner and is conveniently molded of a non-breakable somewhat flexible plastic such as polyethylene.

A spring 7 is disposed between the innermost battery and the case 2 in order to urge the batteries into engagement with the lamp base and a contact means 8, conveniently a copper wire, extends from the center portion of the inner battery or from the spring 7, if one is along the interior wall of the case toward the open end thereof. The wire 8 terminates in operable relation with the switch as will hereinafter more fully appear and its free end is preferably shaped as at 10 in order to facilitate the operation of the switch. Contact means 8 may be molded into position in the case or may be inserted in the case after the same is formed and held in any convenient manner.

Case 2 is closed and the batteries 6 and spring 7 are retained in position by means of the cap assembly indicated generally at 11. Cap assembly 11 includes an annular ring member 12 having front inwardly extending flange 13 which defines the lens area of the flashlight, and a rear inwardly extending flange 14, which is adapted to engage over flange 4 to retain cap assembly 11 on the case. Member 12 is also conveniently molded of plastic such as polyethylene and has sufficient flexibility so that it may be distorted to engage over the flange 4 and sufficient resiliency to return to its normal shape and hold the cap assembly on the case after being forced over the flange 4. The engagement between flanges 4 and 14 is such that member 12 and therefore cap assembly 11 may be selectively, but not accidentally, rotated relative to the case 2 without becoming disengaged therefrom. Thus a predetermined portion of the cap assembly may be positioned in any desired relationship with any desired portion of the case for the purpose and in the manner to be hereinafter more fully described. Member 12 may be provided with a tab 15 to facilitate its removal from and positioning relative to the case.

Cap assembly 11 also includes a reflector 16 having a rearwardly extending sleeve 17, with an aperture at its center through which the lamp base extends, and a flat lens 18. Reflector 16 is conveniently formed of a clear molded plastic such as butyrate or cellulose propionate with suitable plasticizers such as that sold under the trademark Forticel and is then silvered in a conventional manner such as vacuum plating. Lens 18 is conveniently of clear Plexiglas. Reflector 16 is preferably formed with a flat transversely extending flange 20 and the peripheral edges of lens 18 and flange 20, respectively, are held in place within member 12 by means of the force of spring 7 acting through the batteries and cap assembly. Preferably the force exerted by the spring 7 is sufficient to cause a substantially waterproof sealing engagement between the periphery of lens 18 and the interior of flange 13.

A hollow metal socket 24, which is adapted to receive either a threaded or flange type lamp, is disposed within and supported by the sleeve 17 of reflector 16, preferably by means of threads 25. A lamp 26 is removably disposed within the socket 24 with the side 27 of the lamp engaging the socket 24 and the contact 28 of the lamp engaging the center post 29 of the outer battery 6 in the conventional manner.

The electrical circuit is of the usual type extending through the socket 24, lamp base 27, the filaments in lamp 26, contact 27, batteries 6, spring 7, and contact wire 8 and is completed by causing the wire 8 to engage the socket. All of the above is broadly old in the art and while the case 2 and the cap assembly 11 have been described in specific detail it is to be understood that this invention may be used with cases and cap assemblies having other structural characteristics and formed and shaped in different ways from different materials, it being sufficient for the purpose of this invention that the cap assembly and more particularly the cam means to be hereinafter described be adapted to be rotated relative to the case without disengaging or removing the cap assembly from the case.

A switch embodying this invention includes improved means providing for selectively closing the circuit between the contact means 8 and the socket 24. As noted above this improved means is selectively adustable to provide a permanent contact between the socket 24 and the contact means 8 or to provide a gap between the socket and the contact strip such that the contact strip cannot be displaced sufficiently to close the circuit or such that any desired pressure is necessary to displace the contact strip into engagement with the socket or an extension thereof. Further, in its preferred form, the means for completing the circuit is adapted to be positioned by a simple rotation of the cap assembly 11 relative to the case 2 and no part of the switch extends without the case.

To this end an electrically conductive cam 30 is formed integrally with or mounted on socket 24. Cam 30 extends transversely of the case 2 and is disposed in longitudinal alignment with the end 10 of wire 8 and has an outer edge 32 which is of constantly varying radius. Additionally, means is provided to displace the wire 8 toward the cam edge 32. Preferably this means comprises providing the case 2 with a switching area 34 adjacent the end 10 of wire 8 as by reducing the thickness of the wall, so that pressure upon the case at 34 displaces the case and therefore the adjacent end 10 of strip 8 inwardly toward the cam edge 32.

Figures 3, 4:
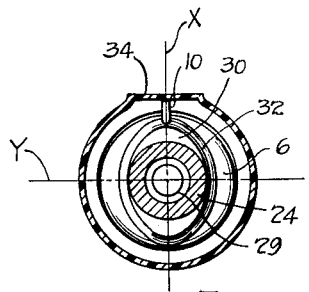
FIGURE 3 is a transverse section viewed along the line 3—3 of FIGURE 1.
FIGURE 4 is a transverse section similar to FIGURE 3 but with the socket rotated 90°.

The size of cam 30 is such that when the cap assembly is rotated so that the portion of cam edge 32 having the longest radius is disposed opposite the switch operating area 34, the cam directly engages the wire 8 completing the circuit without any pressure being exerted in area 34 (see FIGURE 3). Further, when the cap assembly 11 is rotated relative to the case so that the portion of cam edge 32 having the shortest radius is disposed opposite the switch operating area 34 the contact wire 8 cannot be deflected or displaced into engagement with the cam regardless of the amount of pressure exerted on area 34 (see FIGURE 4). And when cap assembly 11 is rotated so that portions of edge 32 intermediate the longest and shortest radii are disposed opposite the switching area, the distance between the edge 32 and the wire 8 will vary inversely as the length of the radius of the edge and therefore the amount of displacement of the contact strip, and pressure on area 34, necessary to establish contact between the contact strip and the cam also varies inversely in accordance with the radius of the edge 32. Thus the pressure which must be exerted on area 34 to close the switch and turn the flashlight on may be selectively predetermined by rotating the cam 30 to place the desired portion of edge 32 opposite wire 8.

As shown in FIGURES 3 and 4, cam 30 is elliptical in shape with a major axis of sufficient length to engage wire 8 directly and minor axis sufficiently short so that the wire cannot be displaced into engagement with the cam.

Figure 5:
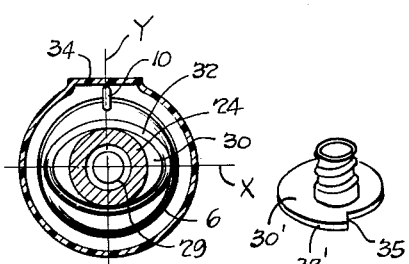
FIGURE 5 is a perspective view of another preferred form of socket for a switch embodying this invention.

Another preferred form of cam 30' is shown in FIGURE 5. In this instance the edge 32' is in the form of an Archimedean spiral with a straight radial portion 35 extending between the longest and shortest radii. Obviously cams of other shapes functioning in a similar manner to obtain the same result can be provided.

Indicia may be provided on the case and cap assembly to indicate the position of the cam relative to the stub, if desired.

When using a flashlight having a switch embodying this invention, it is only necessary to determine what response, as set forth above, is desired of the switch, and then rotate the cap assembly 11 and cam 30 to the proper position relative to the wire 8.

A socket and cam 37 embodying another form of this invention is shown in FIGURE 6. Socket and cam 37 comprises a single length of wire twisted to form a threaded socket for the lamp and having the last turn 39 formed as a flat spiral to function as a cam.

A modified form of switch using this invention is shown in FIGURES 7 and 8, wherein the flashlight case 2 is incorporated in a fishing rod handle 44 and like reference characters refer to like parts.

In this instance the contact means is a thin strip of copper 8' and is displaced into engagement with the edge 32 of cam 30 by means of a probe 46 having an enlarged head 47. Probe 46 is urged out of engagement with strip 8' by spring 48 and the force of the spring is opposed and the probe is displaced inwardly so as to move strip 8' toward and/or into engagement with cam and socket 24 by means of cam 49 which is actuated by lever 50. Cam 49 extends transversely of the handle and is held in place by nut 51 and lever 50 is secured to the outer end of the cam 49. Lever 50 is conveniently a wire bent so that its free end 52 passes transversely of the fish line path substantially as shown and the fish line passes under end 52. The strength of spring 48 is such that under normal circumstances the spring forces the probe 46 outwardly and out of engagement with the contact strip 8'. Should a fish or other load be placed on the fishing line the weight or pull thereof draws the line taut raising end 52 of lever 50 and rotating cam 49 to force the probe inwardly, downwardly as viewed, against the force of spring 48. Probe 46 then engages strip 8' displacing it inwardly against cam edge 32 to complete the circuit, provided the cap assembly 11 has been rotated to position the cam 30 properly relative to strip 8' in the manner described above in connection with the preferred forms of this invention.

Changes and modifications to the preferred and modified forms of the invention herein particularly disclosed and described will occur to those skilled in the art who come to understand the principles and precepts thereof. Accordingly, the scope of this patent should not be limited to the specific forms of the invention herein specifically disclosed and described but by the advance by which the invention has promoted the art.

I claim:

1. In a flashlight or the like having a case with an open end, an outwardly extending flange surrounding said open end, battery means disposed in said case and having positively and negatively charged poles, contact means extending from one said charged pole toward said open end of said case and a cap assembly rotatably supported on said case and having a flange engaging over said flange on said case, a reflector, an electrically conductive socket carried by said reflector and a lamp mounted within said socket and electrically interconnected with the other said charged pole, the improvement of switch means for closing the electrical circuit between said socket and said contact means, said switch means comprising an electrically conductive cam carried by said socket and a deflectable portion in said case radially opposite said cam, said contact means having an end disposed adajcent said deflectable portion of said case and intermediate said cam and said deflectable portion of said case and beind displaced toward said cam by said portion of said case when force is applied to the exterior of said portion of said case, said cam extending transversely of said case and being rotatable with said cap assembly and having an edge of varying radius such that when said cap assembly is rotated to position the portion of said edge of said cam having the shortest radius adjacent said contact means, said contact means cannot be displaced into engagement with said edge of said cam by a force exerted on said deflectable portion and said electrical circuit cannot be closed, when said cap assembly is rotated to position the portion of said edge of said cam having the longest radius adjacent said contact means, said contact means is in continuous functional engagement with said edge of said cam and said electrical circuit is maintained closed, and when said cap assembly is rotated to position a predetermined portion of said edge of said cam having a radius intermediate said shortest and longest radii adjacent said contact means, a force of selectively predetermined magnitude must be exerted on said deflectable portion of said case to displace said contact means into engagement with said edge of said cam to close said electrical circuit.

2. In a flashlight or the like having a case with an open end, contact means for conducting an electric current extending toward said open end, and a cap assembly rotatably supported on said case and closing said open end, said cap assembly including a reflector and an electrically conductive socket for receiving a lamp or the like, the improvement of a switch for closing an electrical circuit between said socket and said contact means, said switch comprising electrically conductive cam means carried by said socket and a deflectable portion in said case radially opposite said cam means, said contact means having an end disposed adjacent said deflectable portion of said case and intermediate said cam means and said deflectable portion of said case and being displaced toward said cam means by said portion of said case when pressure is applied to said portion of said case, said cam means extending transversely of said case and being rotatable with said cap assembly and having an edge of varying radius such that when said cap assembly is rotated to position a first portion of said edge of said cam means adjacent said contact means, said contact means cannot be displaced into engagement with said cam means by a force exerted on said deflectable portion of said case and said electrical circuit cannot be closed, when said cap assembly is rotated to position a second portion of said edge of said cam means adjacent said contact means, said contact means is in continuous functional engagement with said edge of said cam means and said electrical circuit is maintained closed, and when said cap assembly is rotated to position a predetermined other portion of said edge of said cam means adjacent said contact means, a force of selectively predetermined magnitude must be exerted on said deflectable portion of said case to displace said contact means into engagement with said edge of said cam means to close said electrical circuit.

3. The switch according to claim 2 in which said cam means has an elliptical edge.

4. The switch according to claim 2 in which said cam means has an edge having the shape of an Archimedean spiral.

5. The switch according to claim 2 in which said socket means and said cam means is formed of a single piece of wire wound in a longitudinally extending spiral with at least one turn wound in a flat spiral.

6. A switch for closing an electrical circuit therethrough, said switch comprising contact means and cam means mounted for relative rotation about a predetermined axis, said cam means having an edge of varying radius parallel with said axis and in operable relation with said contact means, means for relatively displacing said contact means and said edge in a direction normal to said axis, and means for relatively rotating said contact means and said edge to selectively vary the distance between said contact means and said edge whereby a selectively predetermined force must be exerted by said displacing means to relatively displace said edge and said contact means into mutual engagement to close said circuit.

7. The switch according to claim 6 in which said edge has an elliptical shape.

8. The switch according to claim 6 in which said cam means has an edge in the shape of an Archimedean spiral.

9. A switch for closing an electrical circuit therethrough, said switch comprising contact means and cam means mounted for relative rotation about a predetermined axis, said cam means having an edge of varying radius parallel with said axis and in operable relation with said contact means, means for relatively displacing said contact means and said edge in a direction normal to said axis, and means for relatively rotating said edge and said contact means to a first position in which said contact means and said edge are in permanent engagement, to a second position in which said contact means and said edge cannot be displaced by said displacement means into mutual engagement, and to predetermined positions intermediate said first and second positions in which selectively variable forces must be exerted on said displacing means to displace said contact means and said edge into mutual engagement.

10. In a flashlight or the like comprising a case, a cap assembly having electrically conductive socket means and being supported on said case for relative rotation therewith, and contact means disposed in said case, the improvement of switch means for closing an electrical circuit between said socket means and said contact means, said switch means comprising electrically conductive cam means carried by said socket means and having an edge of varying radius, a portion of said contact means being disposed in spaced, operable relationship with said edge of said cam means and being displaceable toward said edge, and means for displacing said portion of said contact means toward said edge, said cam means extending transversely of said case and being rotatable with said cap assembly so that when said cap assembly is rotated to position a first portion of said edge adjacent said portion of said contact means, said portion of said contact means cannot be displaced into engagement with said edge of said cam means by said displacing means, when said cap assembly is rotated to position a second portion of said edge of said cam means adjacent said portion of said contact means, said portion of said contact means is in continuous engagement with said edge of said cam means and when said cap assembly is rotated to position a predetermined other portion of said edge of said cam means adjacent said portion of said contact means, a force of selectively predetermined magnitude must be exerted on said portion of said contact means by said displacing means to displace said portion of said contact means into engagement with said edge of said cam means.

References Cited in the file of this patent
UNITED STATES PATENTS

| | | |
|---|---|---|
| 761,563 | Wagner | May 31, 1904 |
| 2,027,912 | Kingsbury | Jan. 14, 1936 |
| 2,136,369 | Belcher | Nov. 15, 1938 |
| 2,570,838 | Nathan et al. | Oct. 9, 1951 |
| 2,587,223 | Robinson | Feb. 26, 1952 |
| 2,681,979 | Manoloff | June 22, 1954 |
| 2,681,982 | Seegrist | June 22, 1954 |
| 2,852,633 | Garland | Sept. 16, 1958 |
| 2,852,662 | Garland | Sept. 16, 1958 |